United States Patent
Tsukamoto et al.

(10) Patent No.: US 6,797,437 B2
(45) Date of Patent: Sep. 28, 2004

(54) ELECTROLYTE SYSTEM AND ENERGY STORAGE DEVICE USING SAME

(75) Inventors: Hisashi Tsukamoto, Saugus, CA (US); Tsuneaki Koike, Valencia, CA (US)

(73) Assignee: Quallion LLC, Sylmar, CA (US)

( * ) Notice: Subject to any disclaimer, the term of this patent is extended or adjusted under 35 U.S.C. 154(b) by 0 days.

(21) Appl. No.: 10/034,316

(22) Filed: Dec. 28, 2001

(65) Prior Publication Data

US 2003/0129498 A1 Jul. 10, 2003

(51) Int. Cl.[7] .......................... H01M 6/16; H01M 10/40
(52) U.S. Cl. ...................... 429/306; 429/324; 429/326; 252/62.2
(58) Field of Search ................... 252/62.2; 429/306, 429/324, 326, 330, 332, 338, 342

(56) References Cited

U.S. PATENT DOCUMENTS

| | | | |
|---|---|---|---|
| 5,229,227 A | | 7/1993 | Webber |
| 5,830,600 A | * | 11/1998 | Narang et al. ............... 429/199 |
| 5,916,708 A | | 6/1999 | Besenhard et al. |
| 6,210,835 B1 | * | 4/2001 | Arai ....................... 429/231.95 |
| 6,232,020 B1 | | 5/2001 | Song et al. |
| 2002/0110739 A1 | | 8/2002 | McEwen et al. |
| 2002/0160273 A1 | * | 10/2002 | Arai et al. .................. 429/326 |

FOREIGN PATENT DOCUMENTS

| | | | |
|---|---|---|---|
| EP | 0807986 A | * | 11/1997 |
| EP | 0 631 339 B1 | | 7/2001 |
| EP | 1 205 997 A1 | | 5/2002 |
| EP | 1 253 662 A1 | | 10/2002 |
| JP | 07-249432 | | 9/1995 |
| JP | 10-012272 A | * | 1/1998 |
| JP | 10050343 A2 | | 2/1998 |
| JP | 11317232 A2 | | 11/1999 |
| JP | 2000106209 A2 | | 4/2000 |
| JP | 2000164249 A2 | | 6/2000 |
| JP | 2001060464 A2 | | 3/2001 |
| JP | 2001143749 A2 | | 5/2001 |
| JP | 2002042891 A2 | | 2/2002 |
| JP | 2002190316 A2 | | 7/2002 |
| JP | 2002-190316 | | 7/2002 |

OTHER PUBLICATIONS

Galden PFPE:Heat Transfer Fluids Product Data Sheet for Galden ® HT90 Fluid [online]. Solvay Solexis, Inc., 2002 [retrieved on Feb. 23, 2003]. Retrieved from the Internet : <URL: www.solvaysolexis.com/pdf/gald_heat.pdf>.*

Data sheet for Ethylene Carbonate obtained from Chemfinder.com [online]. CambridgeSoft Corporation, 2003 [retrieved on Feb. 23, 2003]. Retrieved from the Internet: <URL: www.chemfinder.cambridgesoft.com/result.asp>.*

* cited by examiner

Primary Examiner—Susy Tsang-Foster
(74) Attorney, Agent, or Firm—M. Elizabeth Bush

(57) ABSTRACT

A secondary cell employs a non-aqueous electrolyte solution including a non-aqueous solvent and a salt, and a flame retardant material that is a liquid at room temperature and pressure and substantially immiscible in the non-aqueous electrolyte solution. The non-aqueous electrolyte solution is formed by dissolving a salt, preferably an alkali metal salt, in a non-aqueous solvent. The non-aqueous solvent preferably includes a cyclic carbonate and/or a linear carbonate. The cyclic carbonate preferably contains an alkylene group with 2 to 5 carbon atoms, and the linear carbonate preferably contains a hydrocarbon group with 1 to 5 carbon atoms. Preferred salts include $LiPF_6$ and $LiBF_4$ at a concentration from about 0.1 to about 3.0 moles/liter in the non-aqueous solvent. The flame retardant material is preferably a halogen-containing compound, and preferred halogen containing compounds are perfluoroalkyl groups and perfluoroether groups present in an amount per weight of non-aqueous solvent in a range of from about 1 to about 99 wt %.

57 Claims, No Drawings

ELECTROLYTE SYSTEM AND ENERGY STORAGE DEVICE USING SAME

BACKGROUND OF THE INVENTION

Energy storage devices such as batteries that utilize the oxidation and reduction reactions of an alkali metal are known. Such "lithium ion cells" include secondary cells which use a carbon material that can be doped and undoped with lithium ions as a negative pole and which use a complex oxide of lithium and a second metal as a positive pole. Lithium ion cells are compact and lightweight, and have a high energy density. Accordingly, the use of lithium ion cells as secondary cells in portable electronic devices has expanded rapidly. Concurrently, there has been an escalating demand for improved performance, e.g., an increase in the energy density and an increase in the discharge current, etc., in lithium ion cells in order to achieve a further improvement in the function of such portable electronic devices.

The decreased size of such energy storage devices has resulted in the presence of highly energetic active substances in a small, confined volume. As a result, large amounts of energy can be released when electrodes short-circuit or otherwise fail as a result of, for example, piercing and compression that may cause a battery to ignite and catch fire. As the cell capacity has increased, there has been a strong demand for an improvement in battery safety.

Previous attempts to increase safety have been directed to changing electrode construction or changing the active substance. Other studies have focused on additives to the electrolyte solution that increase the safety of the batteries. Thus, for example phosphorus and fluorine compounds such as triphenyl phosphate and fluoro-ethers have been dissolved in the electrolyte solution to improve battery safety. However, these compounds may be subject to oxidation-reduction by the electrodes, or may react with the electrodes so that the capacity is lowered. Although safety is improved when the amounts of additives are increased, battery performance deteriorates. Accordingly, it has been difficult to realize increased safety without causing a deterioration of conventional battery characteristics.

There is thus a continuing need for improved cell capacity, charge-discharge rate, and charge-discharge cycle.

There is also a continuing need for an improved battery with an improved safety profile that does not deteriorate over time.

SUMMARY OF THE INVENTION

One object of the present invention is to provide an electrolyte system for an energy storage device that is extremely safe and has superior charge-discharge characteristics.

Another object of the present invention is to provide an electrolyte system of high conductivity and low viscosity for improving the discharge capacity of a secondary cell battery.

Another object of the present invention is to provide an electrolyte system that is chemically and electrically stable with respect to the positive pole and negative pole of the secondary cell battery.

In accordance with the present invention, an electrolyte system comprises a non-aqueous electrolyte solution including a non-aqueous solvent and a salt, and a flame retardant material that is a liquid at room temperature and pressure and that is substantially immiscible in the non-aqueous electrolyte solution.

The non-aqueous electrolyte solution is formed by dissolving a salt, preferably an alkali metal salt, in a non-aqueous solvent. The non-aqueous solvent is a polar aprotic organic solvent which readily dissolves alkali metal salts, and which is resistant to being electrolyzed by oxidation-reduction at the battery poles. The non-aqueous solvent preferably includes a cyclic carbonate and/or a linear carbonate, wherein the cyclic carbonate preferably contains an alkylene group with 2 to 5 carbon atoms, and the linear carbonate preferably contains a hydrocarbon group with 1 to 5 carbon atoms. Preferred electrolytes include $LiPF_6$, $LiBF_4$, $LiOSO_2R^1$,

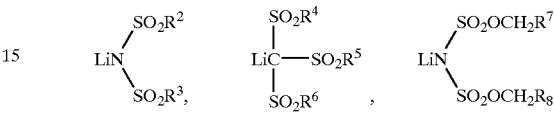

(in the above formulae, $R^1$ through $R^8$ indicate perfluoroalkyl, alkyl or aryl groups with 1 to 6 carbon atoms, which may be the same or different groups). The concentration of the electrolytes in the non-aqueous electrolyte solution is preferably between about 0.1 to 3.0 moles/liter, and more preferably between about 0.5 to 2.0 moles/liter.

The flame retardant material is a liquid at room temperature and pressure and is substantially immiscible in the non-aqueous electrolyte solution. Preferably, the flame retardant material is a halogen-containing compound. Preferred halogen-containing compounds contain perfluoroalkyl groups or perfluoroether groups. The halogen-containing compound is present in an amount by weight of non-aqueous solvent in a range of from about 1 to about 99 wt %, preferably from about 1 to about 70 wt %, even more preferably from about 10 to about 60 wt % and even more preferably from about 20 to about 40 wt %.

An energy storage device in accordance with the present invention comprises the disclosed electrolyte system, an electrode assembly including a first electrode member, a second electrode member, a separator member physically and electrically separating the first electrode member from the second electrode member but capable of allowing ionic conductivity between the first electrode member and the second electrode member through the non-aqueous electrolyte solution, and a casing enclosing the electrode assembly and the electrolyte system. In a energy storage device, such as a battery, the first electrode member is a negative electrode containing a material selected from the group consisting of lithium metal, a lithium alloy, a carbon material that can be doped and undoped with lithium ions, a metal oxide that can be doped and undoped with lithium ions, and silicon that can be doped and undoped with lithium ions, the second electrode member is a positive electrode containing a material selected from the group consisting of complex oxide of lithium and a transition metal, and a complex oxide of lithium, transition metal and a non-transition metal, and the separator member is a resin containing a polymer.

A method of making a energy storage device in accordance with the present invention comprises providing an electrode assembly including a first electrode member, a second electrode member and a separator member physically and electrically separating the first electrode member from the second electrode member but capable of allowing ionic conductivity between the first electrode member and the second electrode member, placing the assembly in a casing, and filling the casing with the electrolyte system of the present invention by first, filling the casing at least partially with the non-aqueous electrolyte solution, waiting a period of time sufficient for the non-aqueous electrolyte solution to penetrate one or more pores of the electrode assembly, and then adding the flame retardant material to the casing.

In practice, the two phase electrolyte system of the present invention realizes significant advantages over the prior art. Because the halogen-containing compound is substantially immiscible in the non-aqueous electrolyte solution, there is little ingress of the halogen-containing compound into the regions within the casing occupied by the non-aqueous electrolyte solution, i.e. in the casing regions separating the positive and negative poles and defined by the separator. As such, there is little interference by the halogen-containing compound in electrochemical reactions occuring at the poles and in the non-aqueous electrolyte solution. Further, the secondary cell is superior in terms of initial capacity and cycle characteristics. Moreover, the halogen-containing compound of the present invention interferes and/or inhibits combustion reactions that may result upon piercing or compression of the battery. Accordingly, the energy storage device of the present invention exhibits enhanced safety over prior art secondary cells.

DETAILED DESCRIPTION OF THE PREFERRED EMBODIMENTS

An electrolyte system for an energy storage device includes a non-aqueous electrolyte solution including a non-aqueous solvent and a salt, and a flame retardant material that is a liquid at room temperature and pressure and that is substantially immiscible in the non-aqueous electrolyte solution. The non-aqueous electrolyte solution permits the exchange of metal ions between the positive pole and negative pole of the battery.

The non-aqueous electrolyte solution of the present invention is formed by dissolving a salt, preferably an alkali metal salt, in a non-aqueous solvent. The non-aqueous solvent of the present invention is preferably a polar aprotic organic solvent which readily dissolves alkali metal salts, and which is resistant to being electrolyzed by oxidation-reduction at the poles.

The non-aqueous solvent of the present invention preferably includes one or more cyclic carbonates of the following general formula:

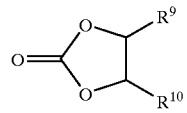

[3]

where $R^9$ and $R^{10}$ may be the same or different, and may be hydrogen, a linear alkyl group, a branched alkyl group, a cyclic alkyl group, or a halogen-substituted alkyl group in which some or all of the hydrogen atoms are substituted by at least one halogen selected from a set consisting of chlorine and bromine. When linear alkyl groups are selected, linear alkyl groups with 1 to 4 carbon atoms such as methyl groups, ethyl groups, propyl groups and butyl groups, etc., are preferred. When branched alkyl groups are selected, branched alkyl groups with 3 to 10 carbon atoms, and especially 3 to 6 carbon atoms, such as isopropyl groups, isobutyl groups, sec-butyl groups and tert-butyl groups, etc., are preferred. When cyclic alkyl groups are selected, cyclic alkyl groups with 5 to 10 carbon atoms such as cyclopentyl groups, cyclohexyl groups and 1-methylcyclohexyl groups, etc., are preferred.

The non-aqueous solvent may include cyclic carbonates having 5-member ring compounds as shown in above formula and 6-member ring compounds. Examples of suitable cyclic carbonates include ethylene carbonate, propylene carbonate, 1,2-butylene carbonate, 2,3-butylene carbonate, 1,3-propylene carbonate, 1,3-butylene carbonate, 2,4-pentylene carbonate, 1,3-pentylene carbonate and vinylene carbonate, etc. Furthermore, halogen-substituted cyclic carbonates in which some or all of the hydrogen atoms in the methyl groups of the aforementioned propylene carbonates, etc., are substituted by at least one halogen selected from a set consisting of fluorine, chlorine and bromine may also be used.

Preferably, the cyclic carbonate contains an alkylene group with 2 to 5 carbon atoms. More preferably, ethylene carbonate and propylene carbonate are used. Two or more such cyclic carbonates may be used in combination.

The non-aqueous solvent of the present invention may additionally include one or more linear carbonates shown in the following general formula:

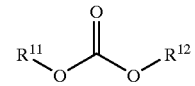

[4]

where $R^{11}$ and $R^{12}$ may be the same or different, and may be branched or cyclic alkyl groups, or halogen-substituted alkyl groups in which some or all of the hydrogen atoms are substituted by at least one halogen selected from a set consisting of fluorine, chlorine and bromine. When a linear alkyl group is selected, linear alkyl groups with 1 to 4 carbon atoms such as methyl groups, ethyl groups, propyl groups and butyl groups, etc., are preferred. When branched alkyl groups are selected, branched alkyl groups with 3 to 10 carbon atoms, such as isopropyl groups, isobutyl groups, sec-butyl groups and tert-butyl groups, etc., are preferred. When cyclic alkyl groups are selected, cyclic alkyl groups with 5 to 10 carbon atoms such as cyclopentyl groups, cyclohexyl groups and 1-methylcyclohexyl groups, etc., are preferred.

Examples of suitable linear carbonates include dimethyl carbonate, diethyl carbonate, di-n-propyl carbonate, dibutyl carbonate, diisopropyl carbonate and methylethyl carbonate, etc. Among such linear carbonates, linear carbonates that contain a hydrocarbon group with 1 to 5 carbon atoms are desirable in the present invention, and dimethyl carbonate, methylethyl carbonate and diethyl carbonate are especially desirable.

The non-aqueous solvent of the present invention may also include one or more solvents selected from the group consisting of cyclic esters such as γ-butyrolactone, γ-valerolactone, 3-methyl-γ-butyrolactone and 2-methyl-γ-butyrolactone, etc., linear esters such as methyl formate, ethyl formate, methyl acetate, ethyl acetate, propyl acetate, methyl propionate, methyl butyrate and methyl valerate, etc., cyclic ethers such as 1,4-dioxane, 1,3-dioxolane, tetrahydrofuran, 2-methyltetrahydrofuran, 3,-methyl-1,3-dioxolane and 2-methyl-1,3-dioxolane, etc., linear ethers such as 1,2-dimethoxyethane, 1,2-diethoxyethane, diethyl ether, dimethyl ether, methylethyl ether and dipropyl ether, etc., sulfur-containing compounds such as sulfolane and dimethyl sulfate, etc., and phosphorus-containing compounds such as trimethylphosphoric acid and triethylphosphoric acid, etc.

The non-aqueous solvent of the present invention may be one solvent used singly or may be a mixture consisting of two or more solvents.

One or more salts are dissolved in the non-aqueous solvent in order to prepare the non-aqueous electrolyte solution of the present invention. Preferably, the concentration of the salts in the non-aqueous electrolyte solution is between about 0.1 to 3.0 moles/liter, and more preferably between about 0.5 to 2.0 moles/liter. The salt used in the present invention may be any salt known to those of ordinary skill in the art to be used in non-aqueous electrolyte solutions of energy storage devices such as secondary cells. The salt may be a single salt or a mixture of salts. Suitable examples of salts include lithium salts such as $LiPF_6$, $LiBF_4$, $LiClO_4$, $LiAsF_6$, $LiAlCl_6$, $Li_2SiF_6$, $LiOSO_2R^1$,

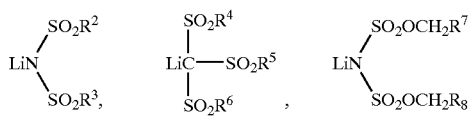

where $R^1$ through $R^8$ may be the same or different, and are perfluoroalkyl, alkyl or aryl groups with 1 to 6 carbon atoms, and alkali metal salts in which the lithium in the above-mentioned salts is substituted by alkali metals. These compounds may be used singly or in mixtures consisting of two or more compounds.

Preferred electrolytes are $LiPF_6$, $LiBF_4$, $LiOSO_2R^1$,

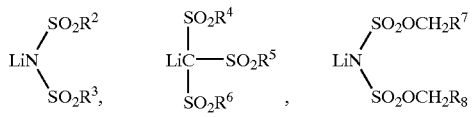

The electrolyte system of the present invention further includes a flame retardant material. A suitable flame retardant material is liquid at room temperature and pressure, is substantially anhydrous and is substantially immiscible with the electrolyte solution. Substantially immiscible means that when the non-aqueous electrolyte solution and the halogen-containing compound are mixed, a meniscus between the two liquids is formed and the concentration of the halogen-containing compound in the non-aqueous electrolyte solution is about 10 wt % or less and preferably, 1000 ppm or less. More preferably, the flame retardant material is completely immiscible in the non-aqueous electrolyte solution. Suitable flame retardant materials are stable with respect to electro-chemical reactions on the electrodes, and are chemically inert with respect to the electrolyte and the non-aqueous solvent in the battery environment. Suitable flame retardant materials are further characterized by having very low vapor pressure at room temperature.

Preferably, the flame retardant material is a halogen containing compound. Suitable halogen-containing compounds include branched or unbranched alkyls, cyclic alkyls, ethers, amino alkyls, aliphatic heterocyclic compounds in which one or more of the hydrogen atoms are substituted with a halogen atom selected from the group consisting of fluorine, chlorine and bromine. In general, increasing efficacy is obtained with increases in the number of halogen atoms. Preferably, the halogen-containing compounds include perfluoroamine and perfluoroether compounds. Preferred halogen-containing compounds include perfluoro-1,3-dimethylcyclohexane and FC-70, sold under the trade name Fluorinert, having a molecular formula $C_{15}F_{33}N$, and commercially available from 3M Co. of St. Paul, Minn.

Preferably, the halogen-containing compound is present in an amount by weight of non-aqueous solvent in a range of from about 1 to about 99% by weight of non-aqueous solvent, preferably in a range of from about 1 to about 70% by weight of non-aqueous solvent, more preferably from about 10 to about 60% by weight of non-aqueous solvent, and even more preferably from about 20 to about 40% by weight of non-aqueous solvent.

In the electrolyte systems of the present invention, the use of the halogen-containing compound and a cyclic carbonate and/or linear carbonate is especially preferred. In cases where a halogen-containing compound and a cyclic carbonate and/or linear carbonate is used, the halogen-containing compound is preferably present in an amount by weight of non-aqueous solvent ranging from about 1 to about 99 wt %, preferably from about 1 to about 70 wt %, more preferably from about 10 to about 60 wt %, and even more preferably from about 20 to about 40 wt %. Furthermore, it is desirable that the aforementioned cyclic carbonate and/or linear carbonate be contained in the non-aqueous solvent in an amount from about 1 to 99 wt %, preferably from about 30 to 99 wt %, and even more preferably from about 40 to 90 wt %.

The electrolyte system of the present invention is used in connection with an electrode assembly and a casing to produce an energy storage device such as a battery. An energy storage device according to the present invention comprises an electrolyte system in accordance with the present invention, an electrode assembly, the electrode assembly including a first electrode member, a second electrode member; and a separator member physically and electrically separating the first electrode member from the second electrode member but capable of allowing ionic conductivity between the first electrode member and the second electrode member through the non-aqueous electrolyte solution, and a casing enclosing the electrode assembly and the electrolyte system.

Preferably the energy storage device in accordance with one embodiment of the present invention is a battery in which the first electrode member is a negative electrode containing a material selected from the group consisting of lithium metal, a lithium alloy, a carbon material that can be doped and undoped with lithium ions, a metal oxide that can be doped and undoped with lithium ions, and silicon that can be doped and undoped with lithium ions. If the negative electrode contains a metal oxide, the metal oxide preferably is chosen from the group consisting of tin oxide and titanium oxide. Preferably, a carbon material that can be doped and undoped with lithium ions is used as the negative pole. Suitable carbon for the negative pole includes graphite or amorphous carbon, activated carbon, carbon fibers, carbon black and meso-carbon, micro-beads, etc.

In this embodiment, the second electrode member is a positive electrode containing a material selected from the group consisting of complex oxide of lithium and a transition metal, and a complex oxide of lithium, transition metal and a non-transition metal. Suitable materials include complex oxides of lithium and transition metals, such as $LiCoO_2$, $LiMnO_2$, $LiMn_2O_4$, $LiNiO_2$ and $LiNi_xCo_{(1-x)}O_2$, etc., and $V_2O_5$, etc.

The separator member may be a porous polymer or ceramic material. Preferably, the separator is a resin containing a polymer, generally a microporous polymer film. Suitable examples include polyesters, polyacetyl and polyethylene.

Energy storage devices may be prepared using the electrolyte system of the present invention as follows. A method of making an energy storage device in accordance with the present invention comprises providing an electrode assembly including a first electrode member, a second electrode member, and a separator member physically and electrically separating the first electrode member from the second electrode member but capable of allowing ionic conductivity contact between the first electrode member and the second electrode member, placing the assembly in a casing, and filling the casing with the electrolyte system that is herein described by first, filling the casing at least partially with the non-aqueous electrolyte solution, waiting a period of time sufficient for the non-aqueous electrolyte solution to penetrate one or more pores of the electrode assembly, and then adding the flame retardant material to the casing. The method of making the energy storage device may further comprise the step of charging the energy storage device after adding the non-aqueous electrolyte solution.

The energy storage devices of the present invention may take any suitable shape or configuration, including a battery of suitable shape and configuration, including a coin type battery, a prismatic battery, a stacked battery, cylindrical battery, etc.

Within the battery casing, the non-aqueous electrolyte solution selected in accordance with the present invention and the halogen-containing compound selected in accordance with the present invention form two separate liquid phases. Since the non-aqueous electrolyte solution and the halogen-containing compound are substantially immiscible, one liquid phase within the battery casing is mainly non-aqueous electrolyte solution and the other liquid phase in the battery casing is mainly halogen-containing compound. In accordance with the present invention, the non-aqueous electrolyte solution phase occupies the region within the casing between the positive pole and the negative pole defined by the separator. As a result, the halogen-containing compound is substantially not in the region between the positive pole and the negative pole defined by the separator and does not interfere with the oxidation-reduction processes at the poles and in the non-aqueous electrolyte solution. However, the halogen-containing compound tends to inhibit the occurrence of highly energetic events such as combustion processes and therefore increases battery safety. Applicant believes the halogen-containing compound may interfere with the production of highly energetic and highly reactive carbon radicals produced in combustion processes and/or interfere with chain reaction processes by production of fluoride radicals.

The following examples are illustrative of certain embodiments of the invention and are not to be construed as limiting the invention thereto.

EXAMPLE 1

A positive pole prepared from $LiCoO_2$ and PVDF poly(vinylidene fluoride)) and a negative pole prepared from graphite and PVDF (poly(vinylidene fluoride)) were fastened together with a separator (manufactured by Tonen) between them, thus producing an electrode assembly. The assembly was then introduced into a battery casing.

A non-aqueous electrolyte solution was prepared by mixing ethylene carbonate (EC), diethyl carbonate (DEC) and $LiPF_6$ in a weight ratio of EC to DEC to $LiPF_6$ of 21.84 wt %: 37.59 wt %: 10.57 wt %. The non-aqueous electrolyte solution was then introduced into the battery casing. After waiting 1 hour, the flame retardant material, a halogen-containing compound, perfluoro-1,3-dimethylcyclohexane was then introduced into the battery casing at a 30% weight ratio of halogen-containing compound to electrolyte solution.

The battery was sealed and charged at 0.1 C. to a charge of 4.3 V by constant-current constant-voltage charging. The battery was then discharged at a constant current and the discharge capacity and safety level measured. The results are shown in Table 1.

EXAMPLE 2

A non-aqueous electrolyte solution and battery were prepared in the same manner as in Example 1, except that FC-70 was used as the halogen-containing compound. The battery discharge capacity and safety level were measured and the results are shown in Table 1.

Comparative Example 1

A non-aqueous electrolyte solution was prepared in the same manner as in Example 1, except that a halogen-containing compound was not added to the electrolyte solution. The battery discharge capacity and safety level were measured and the results are shown in Table 1.

The safety of the energy storage devices was assessed using an "Overcharge Test." The above examples were overcharged at a 4.4–4.5 V. The temperature on the outside of the battery casing was measured. Overcharging was continued until the battery became mechanically detached or until the temperature of the battery casing peaked and began to decrease. Safety was assessed according to a 4 level designation:

Level 1: Maximum Casing Temperature less than 80° C.
Level 2: Maximum Casing Temperature between 80° C. and 120° C.
Level 3: Maximum Casing Temperature over 120° C.
Level 4: Mechanical Detachment As indicated by the results tabulated in Table 1, addition of the halogen-containing compound to the non-aqueous electrolyte solution significantly improved the safety level of the battery (from "4" to either "2" or "1") without adversely affecting the discharge capacity of the battery to any significant degree.

The principal preferred embodiments and modes of operation of the present invention have been described. The invention described herein, however, is not intended to be construed as limited to the particular forms disclosed, since they are regarded as illustrative rather than restrictive. Variations and changes may be made by those skilled in the art without departing from the spirit of the invention.

TABLE 1

| Additive name | Discharge capacity (%) | Safety level | EC ratio (wt %) | DEC ratio (wt %) | $LiPF_6$ ration (wt %) | Additive ratio (%) |
| --- | --- | --- | --- | --- | --- | --- |
| none | 100.0 | 4 | 31.2 | 53.7 | 15.1 | 0 |
| perfluoro-1,3-dimethylcyclohexane | 96.3 | 1 | 21.84 | 37.59 | 10.57 | 30 |
| FC-70 | 93.7 | 2 | 21.84 | 37.59 | 10.57 | 30 |
| FC-70 | 99.5 | 2 | 21.84 | 37.59 | 10.57 | 30 |

TABLE 1-continued

| Additive name | Discharge capacity (%) | Safety level | EC ratio (wt %) | DEC ratio (wt %) | LiPF$_6$ ration (wt %) | Additive ratio (%) |
|---|---|---|---|---|---|---|
| | 100.5 | 2 | 21.84 | 37.59 | 10.57 | 30 |

What is claimed is:

1. An electrolyte-containing system comprising:
   a nonaqueous electrolyte solution including:
      a nonaqueous solvent; and
      a salt; and
   a flame retardant material that is a liquid at room temperature and pressure and substantially immiscible in the nonaqueous electrolyte solution, wherein the flame retardant material comprises perfluoro-1,3-dimethylcyclohexane.

2. The electrolyte-containing system according to claim 1, wherein the salt is present in the non-aqueous electrolyte solution in a concentration ranging from about 0.1 to about 3.0 moles/liter.

3. The electrolyte-containing system according to claim 1, wherein the salt is present in the non-aqueous electrolyte solution in a concentration ranging from about 0.5 to about 2.0 moles/liter.

4. The electrolyte-containing system according to claim 1, wherein the nonaqueous solvent comprises two or more solvents.

5. The electrolyte-containing system according to claim 1, wherein the flame retardant material is present in an amount ranging from about 1 to about 99% by weight of the non-aqueous solvent.

6. The electrolyte-containing system according to claim 1, wherein the flame retardant material is present in an amount ranging from about 1 to about 70% by weight of the non-aqueous solvent.

7. The electrolyte-containing system according to claim 1, wherein the flame retardant material is present in an amount ranging from about 10 to about 60% by weight of the non-aqueous solvent.

8. The electrolyte-containing system according to claim 1, wherein the flame retardant material is present in an amount ranging from about 20 to about 40% by weight of the non-aqueous solvent.

9. The electrolyte-containing system according to claim 1, wherein the nonaqueous solvent includes at least one carbonate selected from the group consisting of cyclic carbonates, linear carbonates, and mixtures thereof.

10. The electrolyte-containing system of claim 9, wherein the at least one carbonate comprises a carbonate selected from the group consisting of: a cyclic carbonate containing an alkylene group with 2 to 5 carbon atoms and a linear carbonate containing a hydrocarbon group with 1 to 5 carbon atoms.

11. The electrolyte-containing system according to claim 1, wherein the non-aqueous solvent includes at least one cyclic carbonate represented by the formula

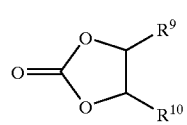

[3]

wherein R$^9$ and R$^{10}$ are independently selected from the group consisting of hydrogen, linear alkyl groups, branched alkyl groups, cyclic alkyl groups, and halogen-substituted alkyl groups in which at least one hydrogen is substituted by chlorine or bromine.

12. The electrolyte-containing system according to claim 1, wherein the non-aqueous solvent includes at least one linear carbonate represented by the formula

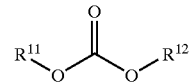

[4]

wherein R$^{11}$ and R$^{12}$ are independently selected from the group consisting of linear alkyl groups, branched alkyl groups, cyclic alkyl groups, and halogen-substituted alkyl groups in which at least one hydrogen atom is substituted by fluorine, chlorine or bromine.

13. The electrolyte-containing system according to claim 1, wherein the salt is selected from the group consisting of: LiPF$_6$, LiBF$_4$, LiOSO$_2$R$^1$,

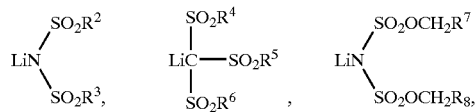

wherein R$^1$ through R$^8$ are independently selected from the group consisting of:
   perfluoroalkyls, alkyls, and aryls with 1 to 6 carbon atoms.

14. An energy storage device comprising:
   an electrode assembly, including:
      a first electrode member;
      a second electrode member; and
      a separator member physically and electrically separating the first electrode member from the second electrode member but capable of allowing ionic conduction between the first electrode member and the second electrode member;
   a nonaqueous electrolyte solution, including a nonaqueous solvent and a salt, occupying a region defined by the separator,
   a flame retardant material that is a liquid at room temperature and pressure and substantially immiscible in the nonaqueous electrolyte solution, and substantially not in the region defined by the separator, and
   a casing enclosing the electrode assembly, the nonaqueous electrolyte solution, and the flame retardant material.

15. The energy storage device according to claim 14, wherein the flame retardant material is a halogen-containing compound.

16. The energy storage device according to claim 15, wherein the halogen-containing compound contains at least one member selected from the group consisting of branched or unbranched alkyl, cyclic alkyl, ether, aminoalkyl, and aliphatic heterocyclic compound groups in which one or more hydrogen atoms are substituted by a halogen selected from the group consisting of fluorine, chlorine, or bromine.

17. The energy storage device according to claim 16, wherein the halogen-containing compound comprises perfluoro-1,3-dimethylcyclohexane.

18. The energy storage device according to claim 16, wherein the halogen-containing compound comprises $C_{15}F_{33}N$.

19. The energy storage device according to claim 15, wherein the halogen-containing compound contains at least one member selected from the group consisting of perfluoroalkyl groups, perfluoroaminoalkyl groups, perfluoroether groups, and mixtures thereof.

20. The energy storage device according to claim 19, wherein the halogen-containing compound comprises $C_{15}F_{33}N$.

21. The energy storage device according to claim 15, wherein the halogen-containing compound is present in an amount ranging from about 1 to about 70% by weight of the nonaqueous solvent.

22. The energy storage device according to claim 15, wherein the halogen-containing compound is present in an amount ranging from about 10 to about 60% by weight of the nonaqueous solvent.

23. The energy storage device according to claim 15, wherein the halogen-containing compound is present in an amount ranging from about 20 to about 40% by weight of the nonaqueous solvent.

24. The energy storage device according to claim 14, wherein the salt is present in the nonaqueous electrolyte solution in a concentration ranging from about 0.1 to about 3.0 moles/liter.

25. The energy storage device according to claim 14, wherein:
the first electrode member is a negative electrode containing a material selected from the group consisting of lithium metal, a lithium alloy, a carbon material that can be doped and undoped with lithium ions, a metal oxide that can be doped and undoped with lithium ions, and silicon that can be doped and undoped with lithium ions,
the second electrode member is a positive electrode containing a material selected from the group consisting of complex oxide of lithium and a transition metal, and a complex oxide of lithium, transition metal and a non-transition metal, and
the separator member is a resin containing a polymer.

26. The energy storage device according to claim 25, wherein the negative electrode contains a metal oxide selected from the group consisting of: tin oxide and titanium oxide.

27. The energy storage device according to claim 25, wherein the energy storage device is a lithium battery.

28. The energy storage device according to claim 14, wherein the nonaqueous electrolyte solution contains about 10 wt % or less of the flame retardant material.

29. The energy storage device according to claim 14, wherein the nonaqueous electrolyte solution contains 1000 ppm or less of the flame retardant material.

30. The energy storage device according to claim 14, wherein the salt is present in the nonaqueous electrolyte solution in a concentration ranging from about 0.5 to about 2.0 moles/liter.

31. The energy storage device according to claim 14, wherein the salt is selected from the group consisting of: $LiPF_6$, $LiBF_4$, $LiOSO_2R^1$,

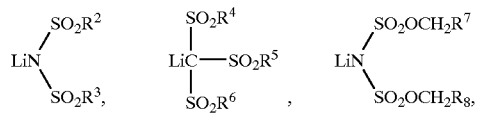

wherein $R^1$ through $R^8$ are independently selected from the group consisting of:
perfluoroalkyls, alkyls, and aryls with 1 to 6 carbon atoms.

32. The energy storage device according to claim 14, wherein the energy storage device is a lithium ion cell.

33. The energy storage device according to claim 14, wherein the energy storage device is a first battery having a discharge capacity of between 93.7% and 100.5% of the discharge capacity of a second battery prepared in the same manner as the first battery except not adding the flame retardant material.

34. The energy storage device according to claim 14, wherein the nonaqueous solvent is resistant to being electrolyzed by oxidation-reduction at the battery poles.

35. The energy storage device according to claim 14, wherein the nonaqueous solvent includes at least one carbonate selected from the group consisting of cyclic carbonates, linear carbonates, and mixtures thereof.

36. The energy storage device of claim 14, wherein the nonaqueous solvent includes at least one carbonate selected from the group consisting of: a cyclic carbonate containing an alkylene group with 2 to 5 carbon atoms and a linear carbonate containing a hydrocarbon group with 1 to 5 carbon atoms.

37. The energy storage device according to claim 14, wherein the nonaqueous solvent includes at least one cyclic carbonate represented by the formula

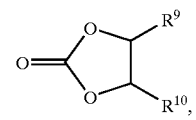

[3]

wherein $R^9$ and $R^{10}$ are independently selected from the group consisting of hydrogen, linear alkyl groups, branched alkyl groups, cyclic alkyl groups, and halogen-substituted alkyl groups in which at least one hydrogen is substituted by chlorine or bromine.

38. The energy storage device according to claim 14, wherein the nonaqueous solvent includes at least one linear carbonate represented by the formula

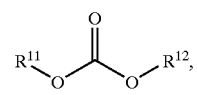

[4]

wherein R11 and R12 are independently selected from the group consisting of linear alkyl groups, branched alkyl groups, cyclic alkyl groups, and halogen-substituted alkyl groups in which at least one hydrogen atom is substituted by fluorine, chlorine, or bromine.

39. The energy storage device according to claim 14, wherein the nonaqueous solvent comprises two or more solvents.

40. An electrolyte-containing system comprising:
a nonaqueous electrolyte solution including:

a nonaqueous solvent; and
a salt; and
a flame retardant material that is a liquid at room temperature and pressure and substantially immiscible in the nonaqueous electrolyte solution, wherein the flame retardant material comprises $C_{15}F_{33}N$.

41. The electrolyte-containing system according to claim 40, wherein the nonaqueous solvent includes at least one carbonate selected from the group consisting of cyclic carbonates, linear carbonates, and mixtures thereof.

42. The electrolyte-containing system according to claim 40, wherein the salt is selected from the group consisting of $LiPF_6$, $LiBF_4$, $LiOSO_2R^1$,

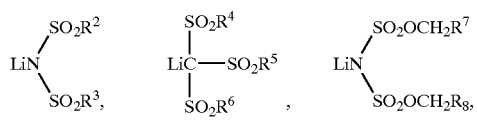

wherein $R^1$ through $R^8$ are independently selected from the group consisting of:
perfluoroalkyls, alkyls, and aryls with 1 to 6 carbon atoms.

43. The electrolyte-containing system according to claim 40, wherein the non-aqueous solvent includes at least one linear carbonate represented by the formula

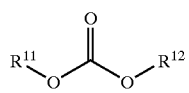 [4]

wherein $R^{11}$ and $R^{12}$ are independently selected from the group consisting of linear alkyl groups, branched alkyl groups, cyclic alkyl groups, and halogen-substituted alkyl groups in which at least one hydrogen atom is substituted by fluorine, chlorine or bromine.

44. The electrolyte-containing system according to claim 40, wherein the salt is present in the non-aqueous electrolyte solution in a concentration ranging from about 0.1 to about 3.0 moles/liter.

45. The electrolyte-containing system according to claim 40, wherein the salt is present in the non-aqueous electrolyte solution in a concentration ranging from about 0.5 to about 2.0 moles/liter.

46. The electrolyte-containing system according to claim 40, wherein the solvent comprises two or more solvents.

47. The electrolyte-containing system according to claim 40, wherein the flame retardant material is present in an amount ranging from about 1 to about 99% by weight of the non-aqueous solvent.

48. The electrolyte-containing system according to claim 40, wherein the flame retardant material is present in an amount ranging from about 1 to about 70% by weight of the non-aqueous solvent.

49. The electrolyte-containing system according to claim 40, wherein the flame retardant material is present in an amount ranging from about 10 to about 60% by weight of the non-aqueous solvent.

50. The electrolyte-containing system according to claim 40, wherein the flame retardant material is present in an amount ranging from about 20 to about 40% by weight of the non-aqueous solvent.

51. The electolyte-containing system of claim 41, wherein the at least one carbonate comprises a carbonate selected from the group consisting of: a cyclic carbonate containing an alkylene group with 2 to 5 carbon atoms and a linear carbonate containing a hydrocarbon group with 1 to 5 carbon atoms.

52. The electrolyte-containing system according to claim 40, wherein the non-aqueous solvent includes at least one cyclic carbonate represented by the formula

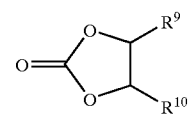 [3]

wherein $R^9$ and $R^{10}$ are independently selected from the group consisting of hydrogen, linear alkyl groups, branched alkyl groups, cyclic alkyl groups, and halogen-substituted alkyl groups in which at least one hydrogen is substituted by chlorine or bromine.

53. A method of making an energy storage device comprising:
providing an electrode assembly including:
a first electrode member;
a second electrode member; and
a separator member physically and electrically separating the first electrode member from the second electrode member but capable of allowing ionic conduction between the first electrode member and the second electrode member;
placing the assembly in a casing; and
filling the casing with an electrolyte-containing system by:
first, filling the casing at least partially with a non-aqueous electrolyte solution;
waiting a period of time sufficient for the non-aqueous electrolyte solution to penetrate one or more pores of the electrode assembly; and
then adding a flame retardant material that is a liquid at room temperature and pressure and substantially immiscible in the nonaqueous electrolyte solution.

54. A method of making an energy storage device according to claim 53, wherein the flame retardant material is added after waiting 1 hour following partially filling the casing with the nonaqueous electrolyte solution.

55. The method of making an energy storage device of claim 53, further comprising the steps of:
sealing the energy storage device; and
charging the energy storage device.

56. The method of making an energy storage device of claim 53, further comprising the step of charging the energy storage device after adding the non-aqueous electrolyte solution.

57. A method of making an energy storage device according to claim 53, wherein the first electrode member is a negative electrode, the second electrode member is a positive electrode, and the separator member is a resin containing a polymer.

* * * * *

UNITED STATES PATENT AND TRADEMARK OFFICE
CERTIFICATE OF CORRECTION

PATENT NO.   : 6,797,437 B2
DATED        : September 28, 2004
INVENTOR(S)  : Hisashi Tsukamoto et al.

It is certified that error appears in the above-identified patent and that said Letters Patent is hereby corrected as shown below:

<u>Column 7,</u>
Line 52, change "PVDF poly" to -- PVDF (poly --.

<u>Column 8,</u>
Table 1, change "(%)" to -- (wt %) --.

Signed and Sealed this

Seventeenth Day of May, 2005

JON W. DUDAS
*Director of the United States Patent and Trademark Office*